Figure 4:
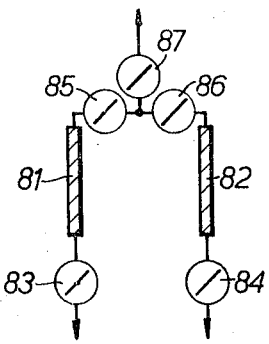

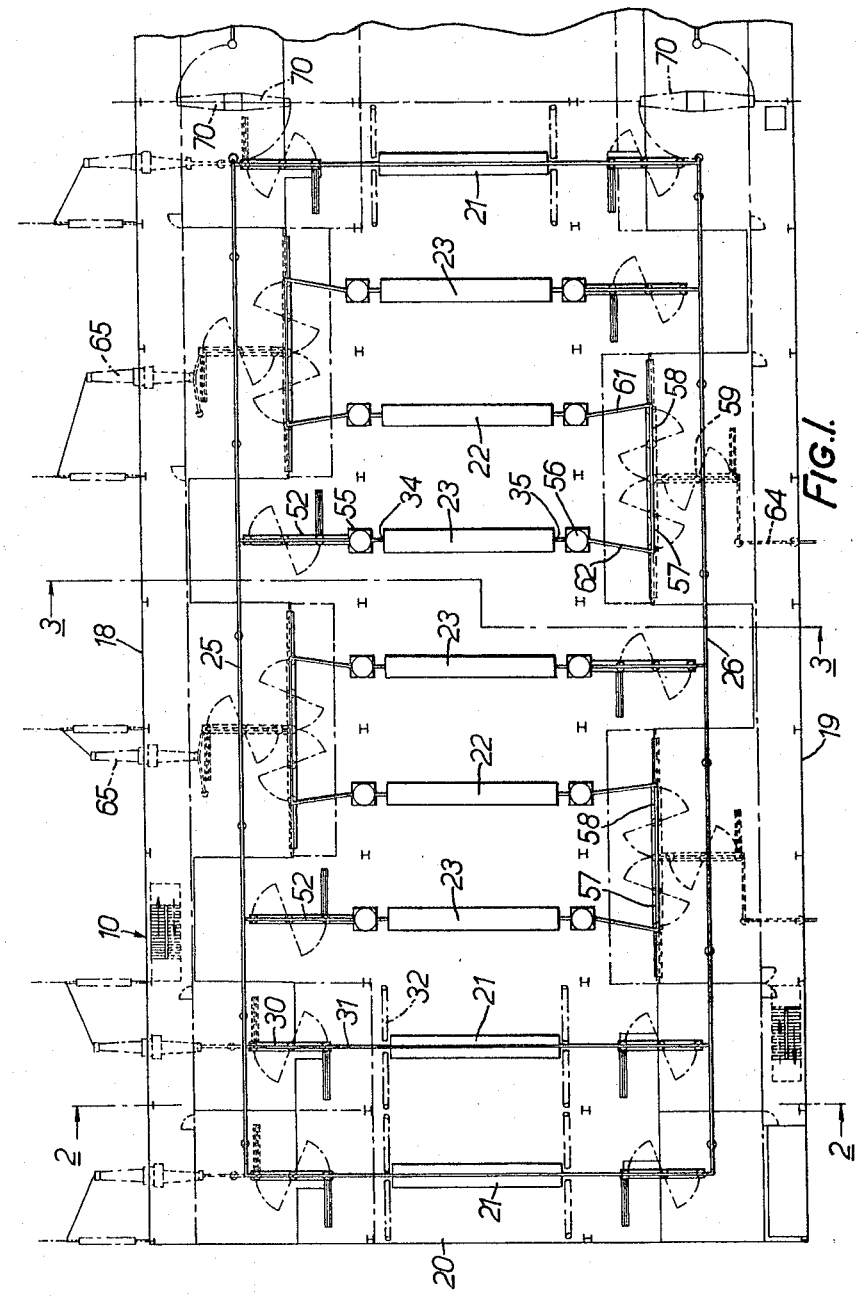

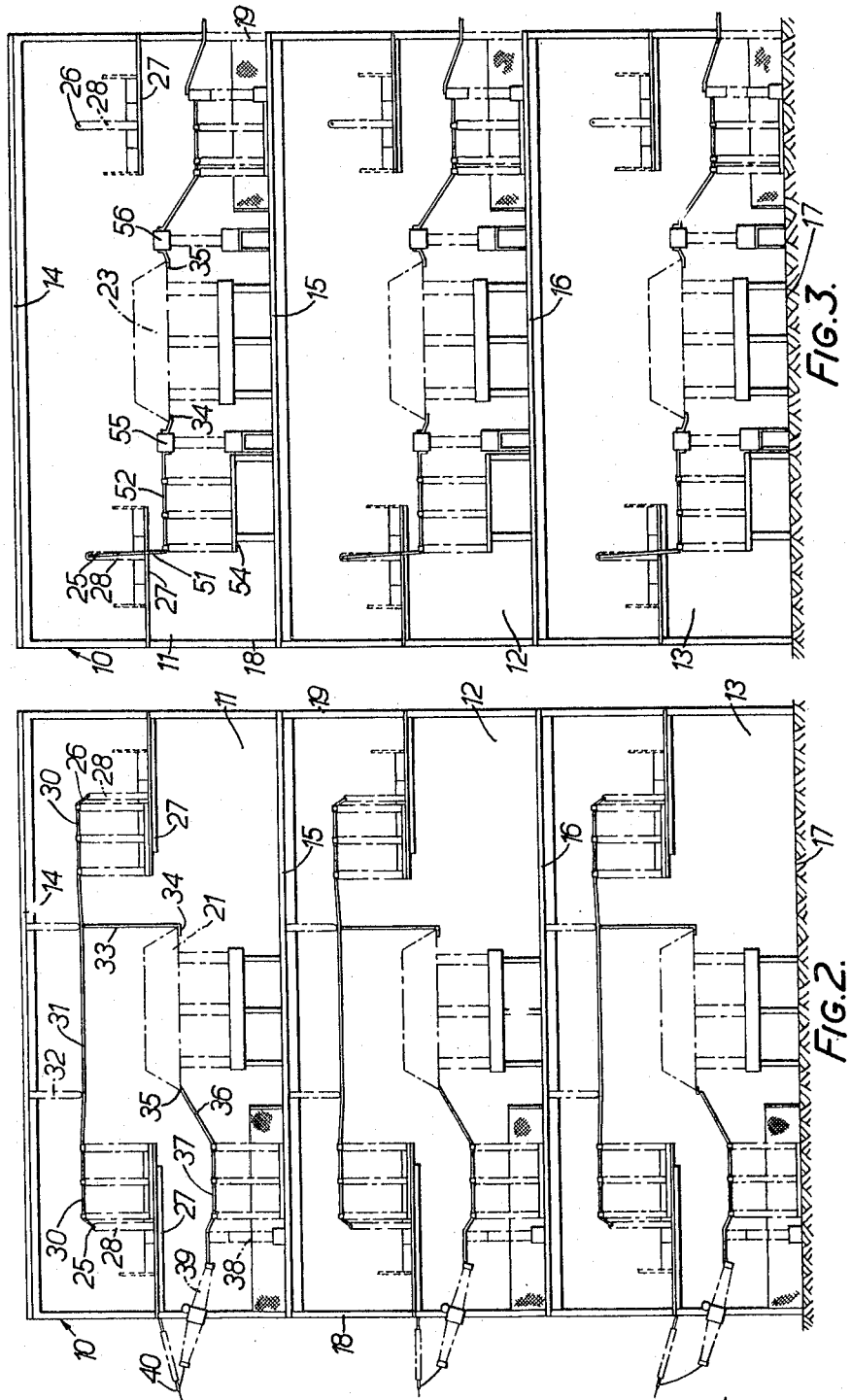

Jan. 31, 1967   T. W. WILCOX   3,302,069
HIGH VOLTAGE ELECTRIC SWITCHGEAR LAYOUT

Filed June 21, 1965   5 Sheets-Sheet 3

INVENTOR
THOMAS W. WILCOX.

BY
Watson, Cole, Grindle + Watson
ATTORNEY

United States Patent Office 3,302,069
Patented Jan. 31, 1967

3,302,069
HIGH VOLTAGE ELECTRIC SWITCHGEAR LAYOUT
Thomas Webster Wilcox, Whitley Bay, England, assignor to Merz and McLellan Services Limited, Newcastle-upon-Tyne, England
Filed June 21, 1965, Ser. No. 465,682
Claims priority, application Great Britain, June 25, 1964, 26,356/64
9 Claims. (Cl. 317—103)

This invention relates to electric switchgear and an object of the invention is to provide an improved lay-out suitable for high voltages, for example 275 or 400 kv., which will provide an inexpensive and compact form of enclosed switchgear.

According to the present invention, in a polyphase electric switchgear assembly, the equipment for each phase is accommodated in a different one of a number of spaces, which will be termed phase layers, situated one above the other and separated from each other by spaced horizontal planes, each phase including a number of circuit-breakers arranged in a row and each having its terminals spaced apart in a direction substantially perpendicular to the line of the row, a number of circuit outlets one or more extending in one direction perpendicular to the line of the row and one or more others in the opposite direction, and at least one bus conductor capable of connecting two circuit-breakers or two circuit outlets, extending generally parallel to the line of the row over the top of at least one circuit outlet.

It will be appreciated that at high voltages, such as 275 or 400 kv., the critical dimension of a circuit-breaker is often the spacing between its terminals. Hence a circuit-breaker for such a voltage tends to be of elongated shape, often comprising a number of units connected in series, with its length in line with the line joining its terminals.

The arrangement referred to, in which each phase is completely segregated from other phases, for example on a separate floor of a building, and each phase includes a number of circuit-breakers arranged in a row with its terminals spaced apart in a direction substantially perpendicular to the line of the row, lends itself to a variety of detailed lay-outs and in particular makes it possible to add further units and develop the system as requirements grow.

Thus in a simple lay-out the bus conductor may form part of a ring or mesh. In a somewhat more extensive lay-out there may be two bus conductors constituted by a pair of parallel busbars one extending over one or more circuit outlets extending in one direction and the other extending over one or more circuit outlets extending in the opposite direction. Conversion from the mesh or ring lay-out to the lay-out with two busbars or from a single breaker arrangement to a one and a half breaker arrangement, or vice versa, may be effected without shifting the circuit-breakers or modifying the existing building.

Thus in one form of the invention in a polyphase switchgear assembly the equipment for each phase is accommodated in a different one of a number of spaces, which will be termed phase layers, situated one above the other and separated from each other by spaced horizontal planes, each phase of the assembly including a row of circuit-breakers, a pair of busbars extending parallel to the row in the same horizontal plane in the upper part of the phase layer, and means including isolators for connecting the busbars through the circuit-breakers to circuit outlets through connections passing under the busbars. Preferably each circuit-breaker is arranged with its terminals spaced apart in a direction substantially perpendicular to the busbars.

In one such arrangement at least one set of switchgear includes isolators substantially in a line joining the two busbars for connecting the circuit-breaker to either busbar.

At least one set of switchgear may include a line isolator for connecting an outlet to the adjacent end of a circuit-breaker situated under the adjacent busbar.

In a further form of the invention at least one set of three circuit-breakers (which will be referred to as a common circuit-breaker between two individual circuit-busbars), are grouped in a one-and-a-half-breaker arrangement, having a T arrangement of isolators partly under one busbar for connecting one circuit outlet to one terminal of the common circuit-breaker or one individual circuit-breaker or connecting these two circuit-breakers together, and another T arrangement of isolators partly under the other busbar for connecting the other circuit outlet to the other terminals of the common circuit-breaker or the other individual circuit-breaker or connecting the latter circuit-breakers together, (the connection in each case being through two of the isolators in series). The terminal of each individual circuit-breaker remote from the T may be connected to the busbar above it by a line isolator situated partly below the said busbar. Again conversion from a single breaker arrangement to a one and a half breaker arrangement or vice versa may be effected without shifting the circuit-breakers or modifying the existing building.

The invention may be performed in various ways but one specific embodiment and certain modifications will be described by way of example with reference to the accompanying diagrammatic drawings in which:

FIGURE 1 is a diagrammatic plan view of one half of one floor of a switching station for a 275 kv. or a 400 kv. system, FIGURE 2 is a section on the line 2—2 of FIGURE 1, FIGURE 3 is a section on the line 3—3 of FIGURE 1, and FIGURES 4 to 12 are diagrams indicating a series of steps in the development of a switch gear lay-out which can be built up without changing the positions of the busbars or circuit-breakers.

In the arrangement shown in FIGURES 1 to 3 the station is housed in a building 10 divided by a number of spaced horizontal planes into three phase layers, 11, 12 and 13 one for each phase. The horizontal planes are occupied by three floors 15, 16 and 17 and a roof 14 and the building is completed by four outer vertical walls of which three, 18, 19 and 20, appear in the drawings.

Down the middle of the building is a row of circuit-breakers 21, 22 and 23 each of which, as indicated above, is of elongated form with its terminals situated at opposite ends and spaced apart in a direction perpendicular to the length of the row. Each circuit-breaker is midway between opposite walls 18 and 19 of the builidng, which will be referred to as the side walls. Each phase layer is provided with two busbars 25 and 26 each mounted between the row of circuit-breakers and one of the side walls.

Each busbar is mounted in the upper part of the phase layer on a gallery 27 projecting from the side wall. For example in a 400 kv. arrangement the height of the layer may be 60 feet, the gallery being half way up the layer, and the busbar, supported by post insulators 28 upstanding from the gallery, may be some 45 feet from the floor and hence some 15 feet from the roof and from the gallery.

Accordingly there is space beneath each busbar gallery to accommodate connections, including arrangements of isolators, from the circuit-breakers to circuit outlets. Equally there is space above the circuit-breakers for isolators and conductors connecting together the two busbars, from which vertical conductors can extend down to which ever terminal of the circuit-breaker is not connected to a circuit outlet.

Thus in a typical set of switchgear as shown in FIGURE 2 each busbar is provided with a busbar isolator 30 supported by, but slightly overhanging, its gallery and the two isolators are joined by a bridging conductor 31 extending horizontally between them and supported by insulators 32 from the roof of the phase layer, the bridging conductor being connected by a vertical down conductor 33 to the appropriate terminal 34 of the circuit-breaker, referred to as the busbar connecting terminal, which can accordingly be connected to either busbar by closing the appropriate busbar isolator 30.

The connections of circuit-breakers to circuit outlets can be arranged in various ways and the specific lay-out being described includes eighteen circuit-breakers, nine in each half of the switchhouse. Of these nine circuit-breakers six (numbered 22 and 23) are grouped in a pair of one-and-a-half circuit-breaker arrangements, whilst each of the other three (numbered 21) is connected in a single breaker engagement.

In the case of the single breaker arrangement as seen in FIGURE 2, the busbar connecting terminal 34 of the circuit-breaker is connected as already described to the horirontal bridging conductor 31 extending above it between the two busbar isolators so that it can be connected to either busbar. The other terminal 35 of the circuit-breaker, which will be referred to as the circuit outlet connecting terminal, is connected by a conductor 36 to a line isolator 37 mounted on the floor of the layer underneath the adjacent busbar gallery, and the line isolator is in turn connected to a capacitive voltage transformer 38 and to a conductor passing through the wall in a bushing insulator 39 and connected to an out-going feeder 40.

Each one-and-a-half breaker group comprises two circuit-breakers 23, which will be referred to as individual circuit-breakers and which can be connected respectively to opposite busbars, and, between the individual circuit-breakers, a third circuit-breaker 22 which will be referred to as the common circuit-breaker and which can connect together two circuit outlets.

Opposite one end of each individual circuit-breaker the gallery of the busbar to which it is connected is interrupted and as seen in FIGURE 3 a down connector 51 extends down from the busbar to a busbar isolator 52 mounted on upstanding insulators on a platform 54 raised above the floor of the layer so that its terminals are slightly below the gallery and approximately level with those of the circuit-breaker. The busbar isolator is connected through a current transformer 55 to the adjacent busbar connecting terminal 34 of the circuit-breaker. The circuit outlet connecting terminal 35 of the circuit-breaker is connected through a current transformer 56 to a T shaped arrangement of three isolators, two 57 and 58 forming the head of the T and the third 59 forming the stem of the T. The terminals of the two isolators at the ends of the head of the T are connected respectively by conductors 61 and 62 to the circuit outlet connecting terminal 35 of the individual circuit-breaker 23, and the corresponding terminal of the common circuit-breaker 22, whilst the isolator terminal at the end of the stem of the T is connected to a circuit outlet for an important circuit 64 or 65 such as a generator or an important feeder.

In the particular embodiment being described one side 19 of the switching station adjoins the generating station and the conductors 64 for the out-going circuits connected to the generator transformers pass through openings in the wall of the building. The circuit outlets 65 to the feeders are on the opposite side of the building and pass through the wall in bushing insulators.

The arrangement of the companion individual circuit-breaker is similar to that of the one already described, except that its busbar isolator is connected to the other busbar and its circuit outlet passes through the opposite side wall of the building. In each case the individual circuit-breaker is arranged to connect a busbar on one side of the building to a circuit outlet passing through the opposite wall of the building.

Each busbar is in two halves which can be connected by a bus isolator 70 mounted in line with the two halves of the busbar and supported by the gallery.

It will be appreciated that the invention is not restricted to the embodiment described by way of example. The embodiment described illustrates the manner in which it is possible to change from a single breaker arrangement without altering the positions of the circuit-breakers or of the busbars and with little or no alteration of the building. In fact the basic lay-out referred to can be developed in accordance with requirements from the simplest to the most sophisticated arrangement.

FIGURE 4 shows what may be regarded as a basic unit, namely a three circuit T comprising a pair of circuit-breakers 81 and 82 mounted parallel to one another with corresponding terminals at one end connected through line isolators 83 and 84 to two out-going circuits and the other two terminals connected together and to a third circuit outlet by a T arrangement of isolators 85, 86 and 87.

Figure 5:
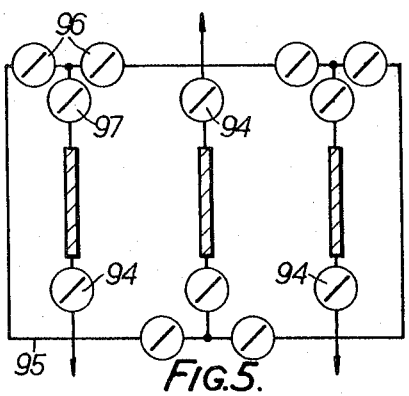

As a next step FIGURE 5 shows a group of three parallel circuit-breakers 91, 92 and 93 arranged in a three circuit ring. Each circuit-breaker has one terminal connected through a line isolator 94 to a circuit outlet, the circuit outlet of the middle circuit-breaker passing through the opposite side wall to those of the other two circuit-breakers. A ring busbar 95 of rectangular form is connected to the other terminal of each circuit-breaker through one of three T-shaped arrangements of isolators, of which two isolators 96 forming the head of the T are included in the ring whilst the third isolator 97 forming the stem of the T is connected to the circuit-breaker.

Figure 6:
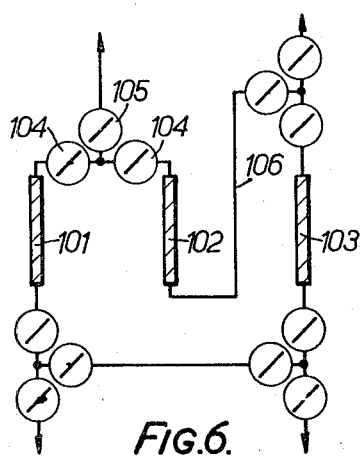

FIGURE 6 shows a further arrangement in which three parallel circuit-breakers 101, 102 and 103 are included in a four circuit open mesh, the circuit-breakers being connected in series or mesh with one another by four T-shaped arrangements of isolators each comprising two isolators 104 connected in the mesh and a third isolator 105 connected to a circuit outlet. One of the T arrangements is connected to the remote terminal of the middle circuit-breaker by a conductor 106 passing between two circuit-breakers.

Figure 7:
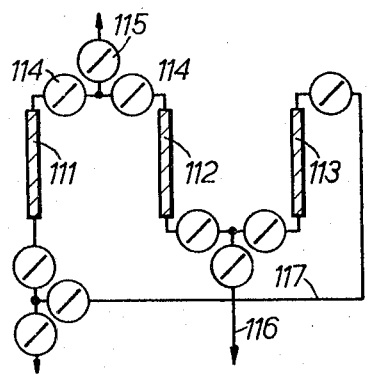

A further arrangement, shown in FIGURE 7, comprises three circuit-breakers 111, 112 and 113 mounted parallel to one another in a row and connected in a three circuit mesh. Again the circuit-breakers are connected in series or mesh through three T-shaped arrangements of isolators each comprising two isolators 114 included in the mesh and a third isolator 115 connected to the circuit outlet. One circuit outlet 116 passes under a conductor 117 of the mesh.

Figure 8:
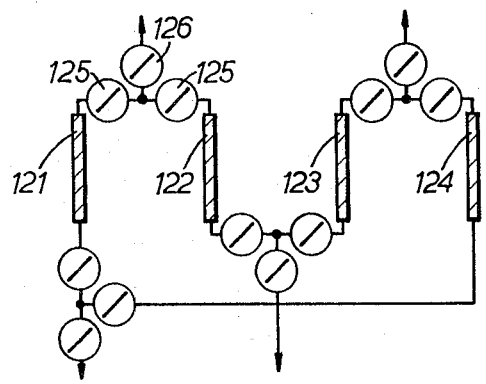

In a further arrangement shown in FIGURE 8 four circuit-breakers 121, 122, 123 and 124 in a row provide a four circuit mesh. Again the circuit-breakers are connected in series or mesh by four T-shaped arrangements of isolators each having two isolators 125 included in the mesh and a third isolator 126 connected to a circuit outlet.

Figure 9:
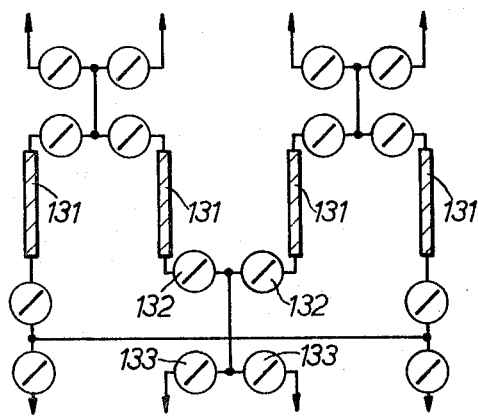

In a further arrangement shown in FIGURE 9 four circuit-breakers 131 arranged in a row provide an eight circuit mesh. The circuit-breakers are connected in series or mesh by four cross or star arrangements each comprising four isolators of which two 132 are included in the mesh whilst the other two 133 are connected respectively to two circuit outlets.

Figure 10:
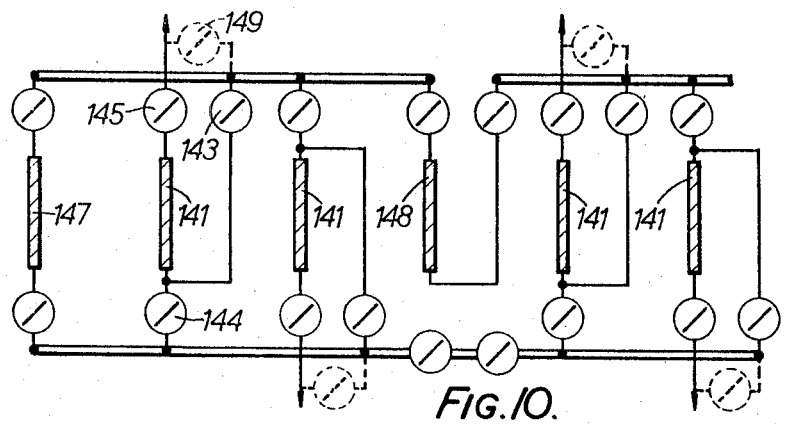

In a further arrangement shown in FIGURE 10 four circuit-breakers 141 arranged in a row provide a four circuit single breaker arrangement. In this case each circuit-breaker is arranged as already described in connection with the specific embodiment described in detail, that is to say it has a busbar connecting terminal which can be connected by one or other of two busbar isolators 143 or 144 to either busbar, and a circuit outlet connecting terminal which can be connected through a circuit outlet isolator 145 to a circuit outlet. Moreover such an arrangement may include an additional circuit-breaker 147 for connecting the two busbars together and an additional circuit-breaker 148 for connecting together two sections of the busbar. Again additional isolators such as 149 may be provided for connecting a circuit outlet direct to the adjacent busbar rather than through its circuit-breaker.

Figure 11:
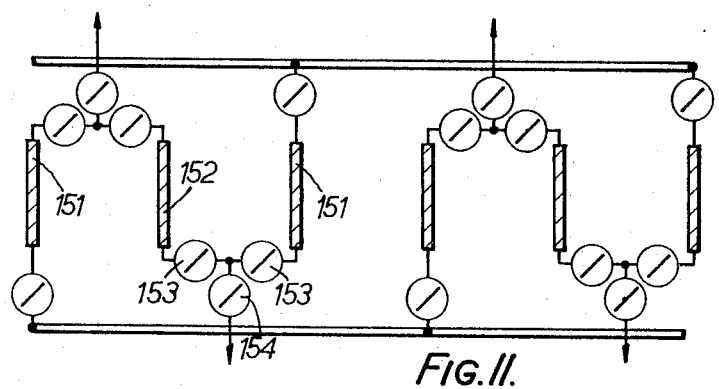

In a further arrangement shown in FIGURE 11 six circuit-breakers 151 and 152 provide a four circuit one-and-a-half breaker arrangement. This comprises two one-and-a-half breaker arrangements as described with reference to FIGURES 1 and 3. That is to say each individual circuit-breaker 151 has a busbar connecting terminal connected through a T arrangement of isolators 153 and 154 on the one hand to a circuit outlet terminal and, on the other hand, to an adjacent terminal of the common circuit-breaker 152.

Figure 12:
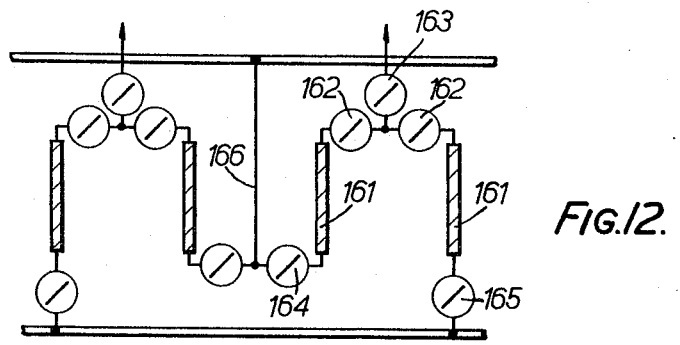

In a further arrangement shown in FIGURE 12 two circuit-breakers 161 provide a duplicate breaker double busbar arrangement. In this case the circuit-breakers have their adjacent ends connected through T arrangements of isolators 162 and 163 to a circuit outlet, the isolators 162 of the head of the T being connected to the circuit-breakers and that 163 of the stem of the T to the circuit outlet. The busbar connecting terminal of one circuit-breaker is connected through a busbar isolator 164 and a conductor 166 to the busbar on the side of the building remote from the circuit outlet, whilst the busbar connecting terminal of the other circuit-breaker is connected through a busbar isolator 165 to the other busbar, namely the busbar overlying the circuit outlet.

A pair of such arrangements may share a common conductor 166 from busbar connecting terminals of one circuit-breaker of each to the remote busbar. The circuit outlets of the two arrangements may pass through the same or opposite walls.

It will be appreciated that the various arrangements described may be mixed and combined in accordance with requirements and in particular depending upon the importance of individual circuits. Thus in the case of a generator circuit or an extremely important feeder circuit a one-and-a-half breaker arrangement or even a duplicate breaker arrangement may be justified, whereas for less important feeders a double busbar single breaker arrangement may suffice. Initially a small station may start with a ring or mesh arrangement which can subsequently be extended to a double busbar arrangement, the busbars taking the place of portions of the ring or mesh whilst no alteration is required to the positions of the circuit-breakers and little or no alteration to the existing building, except to extend it.

What I claim as my invention and desire to secure by Letters Patent is:

1. A polyphase switchgear assembly in which the equipment for each phase is accommodated in a different one of a number of spaces, which will be termed phase layers, situated one above the other and separated from each other by spaced horizontal planes, each phase of the assembly including a pair of busbars extending parallel to one another in the same horizontal plane in the upper part of the phase layer, a row, parallel to the busbars, of circuit breakers located in the space between vertical planes containing the busbars, a plurality of circuit outlets passing under the busbars, and means including isolators for connecting the busbars through the circuit breakers to the circuit outlets.

2. An assembly as claimed in claim 1 in which one busbar extends over at least one circuit outlet extending in one direction and the other busbar extends over at least one circuit outlet extending in the opposite direction.

3. An assembly as claimed in claim 1 in which each circuit breaker is arranged with its terminals spaced apart in a direction substantially perpendicular to the busbars.

4. An assembly as claimed in claim 1 in which at least one set of switchgear includes isolators substantially in a line joining the two busbars for connecting the circuit breaker to either busbar.

5. An assembly as claimed in claim 1 in which at least one set of switchgear includes a line isolator for connecting an outlet to the adjacent end of a circuit breaker situated under the adjacent busbar.

6. An assembly as claimed in claim 1 in which at least one set of three circuit breakers are grouped in a one and a half breaker arrangement, having a T arrangement of isolators partly under one busbar for connecting one circuit outlet to the middle circuit breaker or one end circuit breaker or connecting these two circuit breakers together, and another T arrangement of isolators partly under the other busbar for connecting the other circuit outlet to the middle circuit breaker or the other end circuit breaker or connecting the latter circuit breakers together.

7. An assembly as claimed in claim 6 in which the terminal of each individual circuit breaker remote from the T is connected to the busbar above it by a line isolator situated generally below the said busbar.

8. An assembly as claimed in claim 1 in which the busbars form part of a ring, that is to say a circuit which is in the form of a closed figure and does not include any circuit breakers.

9. An assembly as claimed in claim 1 in which the busbars form part of a mesh, that is to say a circuit which is in the form of a closed figure and includes at least one circuit breaker.

References Cited by the Examiner
UNITED STATES PATENTS

| | | | |
|---|---|---|---|
| 2,345,033 | 3/1944 | Claybourn | 317—103 |
| 3,248,611 | 4/1966 | Wilcox | 317—103 |

ROBERT K. SCHAEFER, *Primary Examiner.*

M. GINSBURG, *Examiner.*